(12) United States Patent
Singh et al.

(10) Patent No.: US 11,560,837 B2
(45) Date of Patent: Jan. 24, 2023

(54) COMBUSTOR DILUTION HOLE

(71) Applicant: General Electric Company, Schenectady, NY (US)

(72) Inventors: Saket Singh, Bangalore (IN); Rimpie Rangrej, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/233,728

(22) Filed: Apr. 19, 2021

(65) Prior Publication Data

US 2022/0333526 A1 Oct. 20, 2022

(51) Int. Cl.
*F23R 3/00* (2006.01)
*F02C 3/14* (2006.01)

(52) U.S. Cl.
CPC ............... *F02C 3/14* (2013.01); *F23R 3/002* (2013.01); *F05D 2220/323* (2013.01); *F05D 2250/141* (2013.01)

(58) Field of Classification Search
CPC .... F02C 3/14; F23R 3/002; F23R 3/04; F23R 3/06; F05D 2220/323; F05D 2250/141
See application file for complete search history.

(56) References Cited

U.S. PATENT DOCUMENTS

| | | | |
|---|---|---|---|
| 3,545,202 A * | 12/1970 | Batt | F23R 3/08 431/352 |
| 5,209,067 A | 5/1993 | Barbier et al. | |
| 6,553,767 B2 | 4/2003 | Farmer et al. | |
| 6,711,900 B1 * | 3/2004 | Patel | F23R 3/60 60/757 |
| 7,059,133 B2 | 6/2006 | Gerendas | |
| 7,726,131 B2 | 6/2010 | Sze et al. | |
| 8,387,397 B2 * | 3/2013 | Chen | F23R 3/06 60/752 |
| 8,739,546 B2 | 6/2014 | Snyder et al. | |
| 9,062,884 B2 * | 6/2015 | Rudrapatna | F23R 3/06 |
| 10,094,564 B2 | 10/2018 | Lebel | |
| 10,551,066 B2 | 2/2020 | Peters et al. | |

(Continued)

FOREIGN PATENT DOCUMENTS

| | | | | |
|---|---|---|---|---|
| CA | 2939125 | | 5/1960 | |
| GB | 2453853 A | * | 4/2009 | ......... C23C 28/3215 |

*Primary Examiner* — Steven M Sutherland
(74) *Attorney, Agent, or Firm* — Venable LLP; Peter T. Hrubiec; Michele V. Frank (57) ABSTRACT

A gas turbine engine that includes a combustor configured for efficient combustion of fuel for the generation of combustion gases. The engine includes an annular combustor that includes an annular wall that defines a channel configured to conduct hot combustion gases along a flow-path of combustion gases. The annular wall has an exterior first surface and an interior second surface. A plurality of dilution holes is defined through the wall. Each dilution hole is defined by a dilution hole surface that extends between an entry end and an exit end. The entry end is defined by the first surface and the exit end is defined by the second surface such that the dilution hole has a convergent and then divergent cross-sectional profile. The entry end has a first geometric shape and the exit end has a second geometric shape that is different than the second geometric shape.

20 Claims, 6 Drawing Sheets

(56) References Cited

U.S. PATENT DOCUMENTS

| | | | |
|---|---|---|---|
| 2004/0045298 A1* | 3/2004 | Pidcock | F23R 3/002 |
| | | | 60/752 |
| 2016/0131364 A1 | 5/2016 | Burd | |
| 2016/0178199 A1 | 6/2016 | Burd | |
| 2016/0186998 A1 | 6/2016 | Kostka, Jr. et al. | |
| 2016/0209033 A1 | 7/2016 | Burd | |
| 2017/0298743 A1* | 10/2017 | Webster | F23R 3/04 |
| 2018/0058223 A1* | 3/2018 | Lehmann | F23R 3/002 |
| 2018/0266324 A1 | 9/2018 | Lao | |
| 2019/0024894 A1 | 1/2019 | Mongillo et al. | |
| 2019/0049115 A1 | 2/2019 | Shenny et al. | |
| 2019/0101289 A1 | 4/2019 | Mongillo, Jr. et al. | |

* cited by examiner

COMBUSTOR DILUTION HOLE

BACKGROUND OF THE INVENTION

The present invention relates generally to combustors of gas turbine engines, and more specifically, to dilution holes that are configured to reduce pollutants emitted from the combustor.

In a gas turbine engine, air is pressurized in a compressor and mixed with fuel in a combustor for generating hot combustion gases. The hot gases flow downstream through turbine stages which extract energy therefrom. A high pressure turbine powers the compressor. A low pressure turbine produces useful work by powering an upstream fan in a typical turbofan gas turbine engine aircraft engine application, for example.

Combustor performance is critical to the overall performance of the gas turbine engine. The compressed air is mixed with fuel in the combustor for generating a fuel and air mixture which is ignited for generating the combustion gases.

Additional air is introduced through dilution holes into the combustor. The additional air is introduced out through the dilution holes are to provide a predetermined ratio of fuel to air in particular regions of the combustor.

BRIEF DESCRIPTION OF THE INVENTION.

The technology disclosed herein is configured to reduce the liner wall gas temperature by as much as 500° F. and eliminate hotspots thus leading to improved durability of the liners. Additional benefits include good controllability of profile/pattern factors and a reduction in the generation of $NO_x$. The disclosed technology provides a gas turbine engine that includes combustors having dilution holes that have a continuously varying contour that extends between an entry end than can be circular and an exit end.

According to one aspect of the technology described herein, a gas turbine engine for an aerospace application that includes a combustor configured for efficient combustion of fuel for the generation of combustion gases, the engine includes: an annular combustor that is disposed about an axis and that includes an annular wall that defines a channel configured to conduct hot combustion gases along a flow-path of combustion gases that is generally parallel to the axis; the annular wall having an exterior first surface and an interior second surface; a plurality of dilution holes defined through the wall, each dilution hole is defined by a dilution hole surface that extends between an entry end that is defined by the first surface and an exit end that is defined by the second surface such that the dilution hole has a convergent and then divergent cross-sectional profile; and wherein the entry end has a first geometric shape and the exit end has a second geometric shape; and wherein the first geometric shape is different than the second geometric shape.

According to another aspect of the technology described herein, an annular combustor that is disposed about an axis, the combustor includes: an annular wall that defines a channel configured to conduct hot combustion gases along a flow-path of combustion gases that is generally parallel to the axis; the annular wall having an exterior first surface and an interior second surface; a plurality of dilution holes defined through the wall, each dilution hole is defined by a dilution hole surface that extends between an entry end that is defined by the first surface and an exit end that is defined by the second surface such that the dilution hole has a convergent and then divergent cross-sectional profile; and wherein the entry end has a first geometric shape and the exit end has a second geometric shape; and wherein the first geometric shape is different than the second geometric shape.

According to another aspect of the technology described herein, there is provided a method for introducing dilution air into the combustion gases of a combustor that includes an annular wall that defines a channel configured to conduct hot combustion gases along a flow-path of combustion gases that is generally parallel to the axis; the annular wall having an exterior first surface and an interior second surface; a plurality of dilution holes defined through the wall, each dilution hole is defined by a dilution hole surface that extends between an entry end that is defined by the first surface and an exit end that is defined by the second surface such that the dilution hole has a convergent and then divergent cross-sectional profile; and wherein the entry end has a first geometric shape and the exit end has a second geometric shape; and wherein the first geometric shape is different than the second geometric shape; the method comprising the steps of: generating combustion gases to create combustion gases along a flow-path of combustion gases; introducing dilution air through the dilution hole into the combustion gases such that the dilution air creates turbulence intersects the combustion gases with a broad profile, and generating turbulence in the combustion gases.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
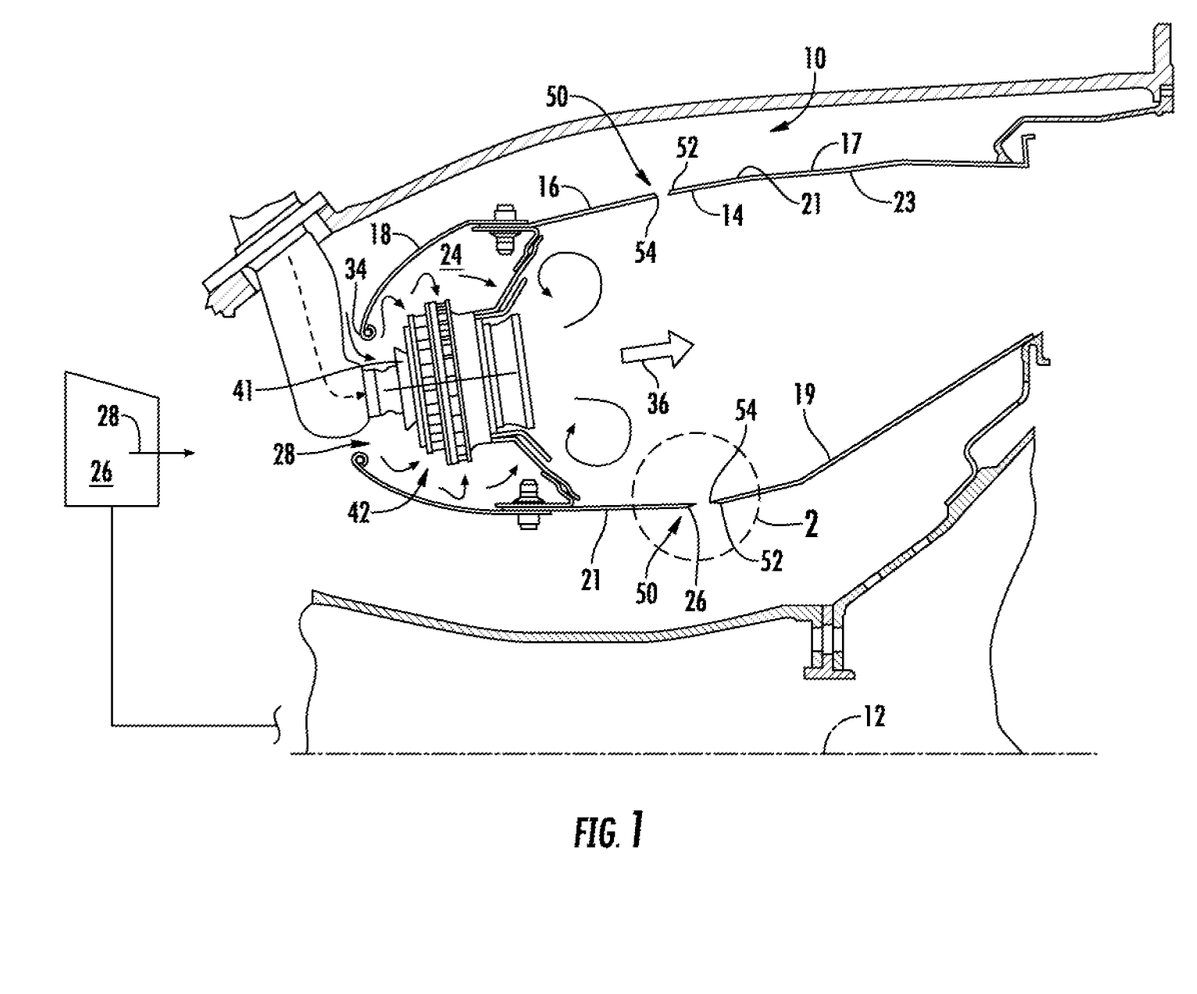
FIG. 1 is an axial, partly sectional view of a portion of an exemplary annular combustor of a turbofan gas turbine engine in accordance with the disclosed technology.

Referring to the drawings wherein identical reference numerals denote the same elements throughout the various views, the disclosed technology illustrated in FIG. 1 is a portion of an exemplary turbofan gas turbine engine including an annular combustor that includes a liner with converging dilution holes, i.e., quench holes, which will be described in detail below. Conventional discrete dilution holes (not shown) are conventional structures used to introduce dilution air into a combustor such as the combustor 10. Discrete dilution holes have inherent problems of hotspots forming axially aft of the dilution hole. In addition, conventional discrete dilution holes define recirculation zones aft which tend to pull in hot gases during operation and thus lead to an increase in production of $NO_x$. The dilution holes 50 of the disclosed technology address this problem by increasing turbulence within the combustor aft of the dilution hole 50. It should be appreciated that the dilution holes 50 can be additively manufactured.

Figure 2:
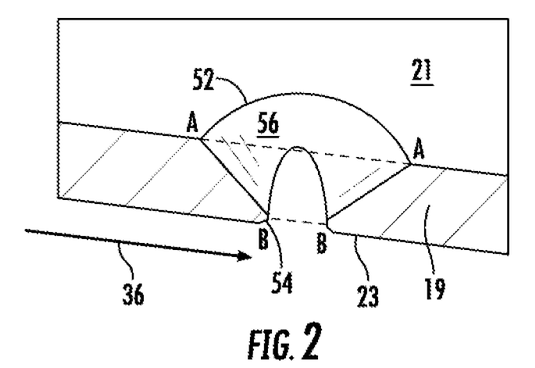
FIG. 2 is an enlarged, axial sectional view of a dilution hole of the combustor of FIG. 1 reference in circle 2 in accordance with the disclosed technology.
Figure 3:
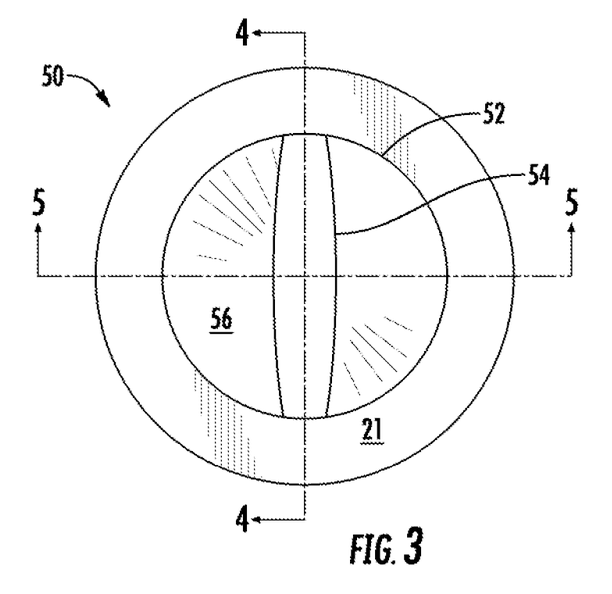
FIG. 3 shows an overhead view plan view of a dilution hole according to the disclosed technology.
Figure 4:
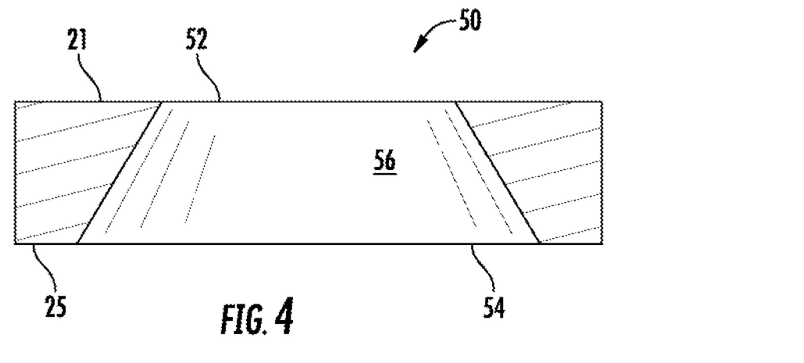
FIG. 4 shows a sectional view taken along line 4-4 of FIG. 3 of a dilution hole according to the disclosed technology.
Figure 5:
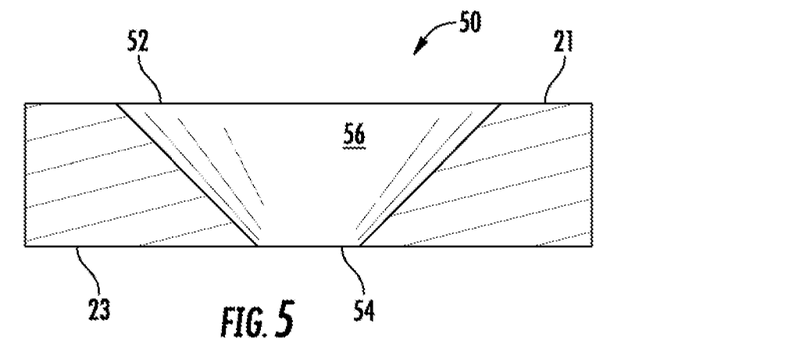
FIG. 5 shows a sectional view taken along line 5-5 of FIG. 3 of a dilution hole according to the disclosed technology.

Referring now to FIGS. 1 and 2, the annular combustor 10 is suitably mounted inside a casing coaxially about a longitudinal or axial centerline axis 12. The combustor 10 is a singular annular combustor design and includes radially outer and inner cowls extending axially forwardly from a dome 18 at the juncture with the outer and inner liners to define an annular plenum 24 on the upstream side of the dome 18.

As shown in FIG. 1, the engine includes a suitable compressor 26, such as a conventional multistage axial compressor, suitably configured for pressurizing and airstream 28 as the airstream 28 flows downstream therethrough. The pressurized airstream 28 is channeled axially downstream from the compressor 26 through a suitable diffuser and is introduced into the plenum 24 through a first annular inlet 34. The combustor 10 as described above and the compressor 26 may have any conventional configuration.

In accordance with the present invention, the combustor 10 illustrated in FIG. 1 includes a plurality of swirlers 42 suitably mounted in the combustor dome 18. A nozzle 41 is configured to inject fuel into the swirler 42 wherein it is mixed within a throat with pressurized air of airstream 28 for generating a fuel and air mixture. The combustor 10 includes an annular combustor liner 14 which is suitably joined at upstream ends thereof to the annular combustor dome 18. The liner 14 includes a wall 19 that has an exterior first surface 21 and an interior second surface 23. The second interior surface 23 defines a channel 15 configured to received and conduct the hot combustion gases resulting from the fuel and air mixture generated within the swirler 42 along a flow-path of combustion gases 36.

The hot combustion gases collectively flow downstream through the channel 15 defined by the second, interior surface 23 of the combustor liner 14. The combustion gases are discharged from the outlet end of the combustor into a high pressure turbine (not shown) which extracts energy therefrom for powering the compressor 26. A low pressure turbine (not shown) is disposed downstream of the high pressure turbine and is suitably configured for producing output power, such as for powering an upstream fan in a typical turbofan gas turbine engine aircraft application.

The annular combustor liner 14 includes integrally joined front and rear portions 16 and 17 respectively. The front and the rear portions 16 and 18 are mechanically joined using an overlapping portion according to one embodiment. In other embodiments, the liner 14 is formed in an additive manufacturing process is one unitary body and does not have front and rear portions that are initially separate bodies that is subsequently mechanically joined.

Referring now to FIGS. 2-5, the liner 14 includes a wall 19 that defines a plurality of dilution holes 50 formed therethrough. Each dilution hole 50 extends from the first surface 21 of the wall 19 through the wall 19 to the second surface 23 of the wall 19 such that it connects the first surface 21 with the second surface 23. The dilution hole 50 has an entry end 52 defined by the first surface 21 and an exit end 54 defined by the second surface 23. According to the illustrated embodiment each dilution hole 50 has a generally circular shape at the entry end 52 and a generally elliptical shape at the exit end 54. It should be appreciated that in other embodiments, the entry end 52 can have various shapes other than circular. It should also be appreciated that the exit end 54 can have various shapes other than elliptical.

Figure 10:
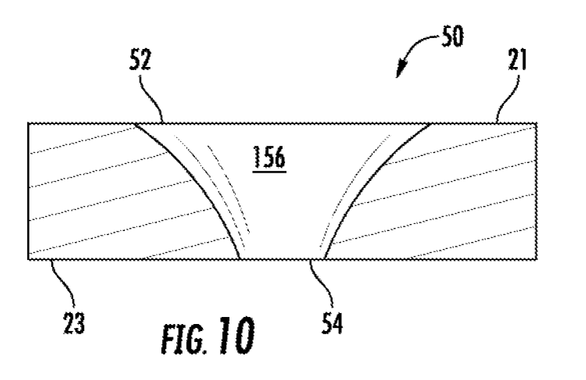
FIG. 10 shows a sectional view similar to that of FIG. 5 of a dilution hole according to another embodiment of the disclosed technology.

A dilution hole surface 56 is defined between the entry end 52 and the exit end 54 by the wall 19. The surface 56 is shaped such that the dilution holes 50 have a convergent and then divergent cross-sectional profile as shown in FIGS. 2, 5, 7, and 10. Surface 56 can define a variety of cross-sectional shapes. For example, FIG. 10 shows a hole 50 where a cross section of a surface 56 defines a curve instead of a straight line as the surface 56 does in FIG. 5. It should be appreciated that in different embodiments, the surface 56 can define profiles other than the straight line of FIG. 5 and the curve of FIG. 10. By way of example, and not limitation, the surface 56 can define shapes including slots, grooves, serrations, and a combination thereof At a predetermined position between the entry end 52 and the exit end 54, the cross-sectional profile has an area $X''$. The area $X''$ of the hole 50 varies continuously from inlet to exit as the shape of the cross sectional profile transitions from circular at the entry end 52 to elliptical at the exit end 54. More specifically, the entry end 52 defines a first area $X^{52}$ across the hole 50 that is bounded by a circle at the interface of the surface 56 and the surface 21 in a plane that includes the chord A-A. Similarly, the exit end 54 defines a second area $X^{54}$ across the hole 50 that is bounded by an ellipse at the interface of the surface 56 and the surface 23 in a plane that includes the chord B-B. The cross sections areas $X''$ are between, and parallel to the first area $X^{52}$ and the second area $X^{54}$. The area ratio of the entry end 52 first area $X^{52}$ to the exit end 54 second area $X^{54}$ can be 1 or greater than 1. It should be noted that even as the cross-sectional areas decrease the width of the exit 54 increases to greater than the width of the entry 52 creating a divergent discharge at exit 54. Thus, there is defined a convergent profile along the combustor axis i.e., flow direction and divergent profile normal to the combustor axis.

As used herein and continuing to refer to FIG. 2, the term "convergent cross-section" refers to a cross-section where a chord A positioned at a predetermined location across the cross-section and entry end 52 is longer than a chord B positioned at a predetermined location across the cross-section at the exit end 54. As used herein, the term "divergent cross section" refers to a cross-section where a chord A positioned at a predetermined location across the cross-section and entry end 52 is shorter than a chord B positioned at a predetermined location across the cross-section at the exit end 54 As used herein, the term "elliptical" refers to a shape having a long axis and a shorter axis as can be seen in the depictions of the exit end 54 in FIGS. 6, 8, and 9. These shapes include an ellipse defined as a regular oval shape, traced by a point moving in a plane so that the sum of its distances from two other points (the foci) is constant, or resulting when a cone is cut by an oblique plane which does not intersect the base. The longer axis of such shapes is also referred to as the major axis. The shorter axis of such shapes also referred to as the minor axis.

Figure 6:
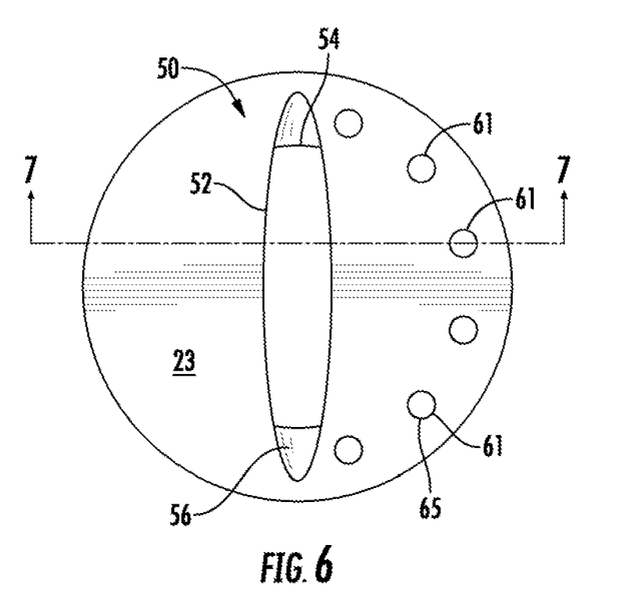
FIG. 6 shows an array of subsidiary dilution holes position near a dilution hold in accordance with one embodiment of the disclosed technology.
Figure 7:
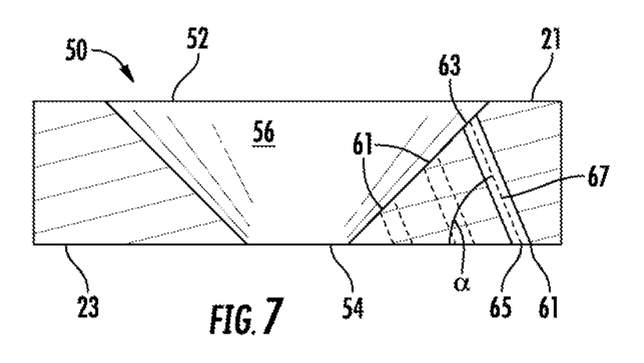
FIG. 7 shows a sectional view of the dilution holes of FIG. 6 taken along line 7-7.

FIGS. 6 and 7 show a plan view of a dilution hole 50 from within the liner 14 and the channel 15. An array of secondary holes 61 are positioned downstream of the exit 54 of the hole

50. Each hole 61 extends between a first, secondary hole entry end 63 defined at the inner surface 56 of the hole 50 and a second, secondary hole exit end 65 defined at the second surface 23 of the wall 19. In this manner each hole 61 is configured such that the surface 56 and the surface 23 are fluidly connected through each hole in addition to being fluidly connected via the exit hole 54. Each hole 61 is generally cylindrical about an axis 67. The hole 61 is positioned such that the axis 67 and the interior surface 23 define an angle α. The angle α is preferably between about 10° and about 80°. One problem with conventional combustors is that airflow within the combustor can be nonuniform and create hotspots. The hole 61 is configured to address this problem such that the hole 61 is configured to provide an increased dilution flow and further improve penetration of flow into the channel 15 of the combustor 10 aft of the dilution hole 50. One problem with combustors is that airflow within the combustor can be nonuniform and create hotspots.

Figure 8:
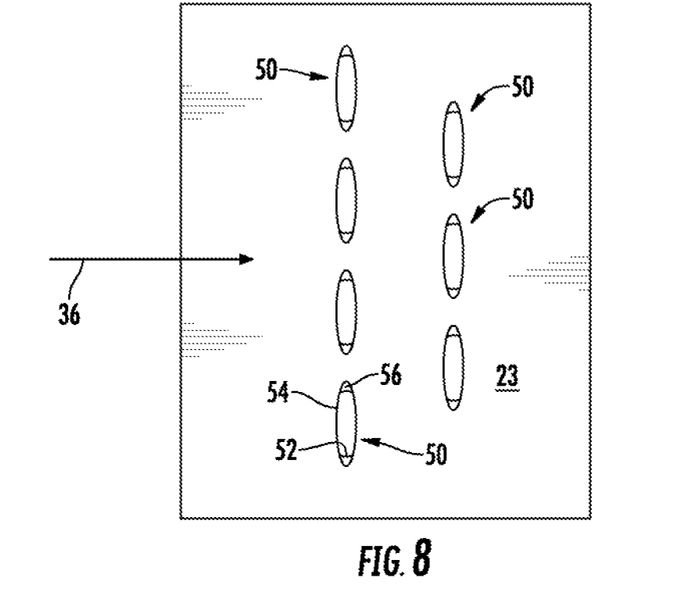
FIG. 8 shows an array of dilution holes according to the disclosed technology.
Figure 9:
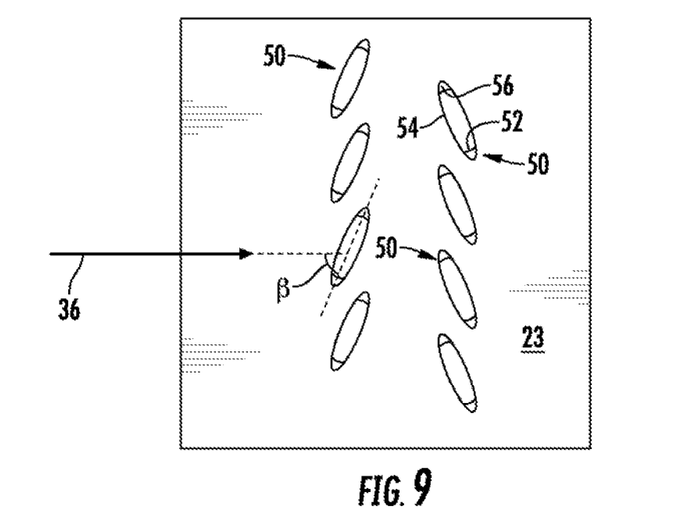
FIG. 9 shows another array of dilution holes according to the disclosed technology.

Referring now to FIGS. 8 and 9, dilution holes 50 can be arranged such that they are radially disposed around the liner 14 in a conventional pattern as shown in FIG. 8 such that the long axes of the exits 54 are arranged generally perpendicularly to the flow-path of combustion gases 36 (as indicated above, the flow-path of combustion gases 36 is generally parallel to the axis 12). As shown in FIG. 9, in accordance with the disclosed technology, the holes 50 are arranged around the liner 14 such that the exits 54 of the holes 50 are oriented at an angle β relative to the flow-path of combustion gases 36. Preferably, the angle β is between 45° and 135. Each dilution hole 50 can have a different angle β such that turbulence is affected as desired, i.e., either increased or decreased. The holes 50 are distributed such that the exits 54 define a predetermined shape such as a fan shape on the surface 56. This array of the exits 54 results in increasing dilution, i.e., increased contact and mixing of the dilution air with the hot combustion gases in the flow-path of combustion gases 36. In this manner the array of the exits 54 addresses another problem with conventional combustors by reducing the amount of pollutants such as nitrogen oxides ($NO_x$) that are created and aiding in the production of predictable flow profiles.

The presently disclosed technology can be better understood from a description of the operation thereof. During operation the combustor 10 promotes efficient combustion of fuel for the generation of combustion gases. In this regard, during operation of the combustor 10, air 28 is pressurized by compressor 26. 28 then flows through annular inlet 34 to enter plenum 24. The high temperature combustion gases 36 are generated and pass through channel 15. Dilution air, i.e., a quench air jet, passes through the hole 50 and enters the channel 15 and in this manner defines a plume having a broad side oriented as the exit 54 is oriented. The dilution air interacts with the combustion gases generating more turbulence than conventional dilution air thereby resulting in better quenching of hot gases with respect to conventional designs. Spreading the discharged dilution air to create turbulence.

The foregoing has described an apparatus, i.e., a combustor liner that includes dilution holes formed with converging cross-sectional profiles such that air flow entering the combustor via the dilution hole is more turbulent and affects better mixing than conventional dilution holes. Other commercial advantages include: The dilution holes can be made in the form of inserts to existing gas turbine combustor liners and attached to the liner, the dilution holes and/or liner can be made additively, there is better emissions such as $NO_x$.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not limited to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Further aspects of the invention are provided by the subject matter of the following numbered clauses:

1. A gas turbine engine for an aerospace application that includes a combustor configured for efficient combustion of fuel for the generation of combustion gases, the engine comprising: an annular combustor that is disposed about an axis and that includes an annular wall that defines a channel configured to conduct hot combustion gases along a flow-path of combustion gases that is generally parallel to the axis; the annular wall having an exterior first surface and an interior second surface; a plurality of dilution holes defined through the wall, each dilution hole is defined by a dilution hole surface that extends between an entry end that is defined by the first surface and an exit end that is defined by the second surface such that the dilution hole has a convergent and then divergent cross-sectional profile; and wherein the entry end has a first geometric shape and the exit end has a second geometric shape; and wherein the first geometric shape is different than the second geometric shape.

2. The gas turbine engine according to any preceding clause, wherein the second geometric shape is an ellipse and therefore has a long axis.

3. The gas turbine engine according to any preceding clause, wherein the first geometric shape is a circle.

4. The gas turbine engine according to any preceding clause, wherein the long axis of the ellipse is oriented perpendicularly relative to the flow path of combustion gases.

5. The gas turbine engine according to any preceding clause, wherein the long axis of the ellipse is oriented between 50° and about 90° relative to the flow path of combustion gases.

6. The gas turbine engine according to any preceding clause, wherein the long axis of the ellipse is oriented about 75° relative to the flow path of combustion gases.

7. The gas turbine engine according to any preceding clause, wherein the long axis of the ellipse is greater than a diameter of the circle.

8. The gas turbine engine according to any preceding clause, wherein the long axis of the ellipse is oriented between 50° and about 90° relative to the flow path of combustion gases.

9. The gas turbine engine according to any preceding clause, further comprising an array of secondary holes defined through the annular wall such that they are generally cylindrical about a secondary hole axis and extend between an entrance defined by the dilution hole surface and an exit defined by the interior surface wherein the secondary hole axis and the interior surface define an angle α that is between about 10° and about 80°.

10. An annular combustor that is disposed about an axis, the combustor comprising: an annular wall that defines a channel configured to conduct hot combustion gases along a flow-path of combustion gases that is generally parallel to the axis; the annular wall having an exterior first surface and an interior second surface; a plurality of dilution holes defined through the wall, each dilution hole is defined by a dilution hole surface that extends between an entry end that is defined by the first surface and an exit end that is defined by the second surface such that the dilution hole has a convergent and then divergent cross-sectional profile; and wherein the entry end has a first geometric shape and the exit end has a second geometric shape; and wherein the first geometric shape is different than the second geometric shape.

11. The gas turbine engine according to any preceding clause, wherein the second geometric shape is an ellipse and therefore has a long axis.

12. The gas turbine engine according to any preceding clause, wherein the first geometric shape is a circle.

13. The gas turbine engine according to any preceding clause, wherein the long axis of ellipse is oriented perpendicularly relative to the flow path of combustion gases.

14. The gas turbine engine according to any preceding clause, wherein the long axis of ellipse is oriented between 50° and about 90° relative to the flow path of combustion gases.

15. The gas turbine engine according to any preceding clause, wherein the long axis of ellipse is oriented about 75° relative to the flow path of combustion gases.

16. The gas turbine engine according to any preceding clause, wherein the long axis of ellipse is greater than a diameter of the circle.

17. The gas turbine engine according to any preceding clause, wherein the long axis of ellipse is oriented about 90° relative to the flow path of combustion gases.

18. The gas turbine engine according to the preceding clause, further comprising an array of secondary holes defined through the annular wall such that they are generally cylindrical about a secondary hole axis and extend between an entrance defined by the dilution hole surface and an exit defined by the interior surface wherein the secondary hole axis and the interior surface define an angle α that is between about 10° and about 80°.

19. A method for introducing dilution air into the combustion gases of a combustor that includes an annular wall that defines a channel configured to conduct hot combustion gases along a flow-path of combustion gases that is generally parallel to the axis; the annular wall having an exterior first surface and an interior second surface; a plurality of dilution holes defined through the wall, each dilution hole is defined by a dilution hole surface that extends between an entry end that is defined by the first surface and an exit end that is defined by the second surface such that the dilution hole has a convergent and then divergent cross-sectional profile; and wherein the entry end has a first geometric shape and the exit end has a second geometric shape; and wherein the first geometric shape is different than the second geometric shape;, the method comprising the steps of: generating combustion gases to create combustion gases along a flow-path of combustion gases; introducing dilution air through the dilution hole into the combustion gases such that the dilution air creates turbulence intersects the combustion gases with a broad profile, and generating turbulence in the combustion gases.

20. The method according to any preceding clause, further comprising the step of spreading the discharged dilution air to create turbulence.

What is claimed is:

1. A gas turbine engine comprising:
   an annular combustor that is disposed about an axis and that includes an annular wall that defines a channel configured to conduct hot combustion gases along a flow path of combustion gases that is generally parallel to the axis;
   the annular wall having an exterior first surface and an interior second surface;
   a plurality of dilution holes defined through the annular wall, a dilution hole of the plurality of dilution holes is defined by a dilution hole surface that extends between an entry end that is defined by the exterior first surface and an exit end that is defined by the interior second surface such that the dilution hole has a convergent cross-sectional profile along a first axis and a divergent cross-sectional profile along a second axis, the second axis being normal to the first axis, wherein the entry end has a first geometric shape and the exit end has a second geometric shape, and the first geometric shape is different than the second geometric shape; and
   an array of secondary holes defined through the annular wall, the array of secondary holes extending between an entrance defined by the dilution hole surface and an exit defined by the interior second surface.

2. The gas turbine engine according to claim 1, wherein the second geometric shape is an ellipse and therefore has a long axis.

3. The gas turbine engine according to claim 2, wherein the first geometric shape is a circle.

4. The gas turbine engine according to claim 3, wherein the long axis of the ellipse is oriented perpendicularly relative to the flow path of combustion gases.

5. The gas turbine engine according to claim 3, wherein the long axis of the ellipse is oriented between 50° and 90° relative to the flow path of combustion gases.

6. The gas turbine engine according to claim 5, wherein the long axis of the ellipse is oriented about 75° relative to the flow path of combustion gases.

7. The gas turbine engine according to claim 3, wherein the long axis of the ellipse is greater than a diameter of the circle.

8. The gas turbine engine according to claim 7, wherein the long axis of the ellipse is oriented about 90° relative to the flow path of combustion gases.

9. The gas turbine engine according to claim 7, wherein the array of secondary holes are generally cylindrical about a secondary hole axis, and the secondary hole axis and the interior second surface define an angle α that is between 10° and 80°.

10. An annular combustor that is disposed about an axis, the annular combustor comprising:
    an annular wall that defines a channel configured to conduct hot combustion gases along a flow path of combustion gases that is generally parallel to the axis;
    the annular wall having an exterior first surface and an interior second surface;
    a plurality of dilution holes defined through the annular wall, a dilution hole of the plurality of dilution holes is defined by a dilution hole surface that extends between an entry end that is defined by the exterior first surface and an exit end that is defined by the interior second surface such that the dilution hole has a convergent cross-sectional profile along a first axis and a divergent cross-sectional profile along a second axis, the second axis being normal to the first axis, wherein the entry end has a first geometric shape and the exit end has a second geometric shape, and the first geometric shape is different than the second geometric shape; and an array of secondary holes defined through the annular wall, the array of secondary holes extending between an entrance defined by the dilution hole surface and an exit defined by the interior second surface.

11. The annular combustor according to claim 10, wherein the second geometric shape is an ellipse and therefore has a long axis.

12. The annular combustor according to claim 11, wherein the first geometric shape is a circle.

13. The annular combustor according to claim 12, wherein the long axis of the ellipse is oriented perpendicularly relative to the flow path of combustion gases.

14. The annular combustor according to claim 12, wherein the long axis of the ellipse is oriented between 50° and 90° relative to the flow path of combustion gases.

15. The annular combustor according to claim 14, wherein the long axis of the ellipse is oriented about 75° relative to the flow path of combustion gases.

16. The annular combustor according to claim 15, wherein the long axis of the ellipse is greater than a diameter of the circle.

17. The annular combustor according to claim 16, wherein the array of secondary holes are generally cylindrical about a secondary hole axis, and the secondary hole axis and the interior second surface define an angle α that is between 10° and 80°.

18. The annular combustor according to claim 14, wherein the long axis of the ellipse is oriented about 90° relative to the flow path of combustion gases.

19. A method for introducing dilution air into combustion gases of a combustor that is disposed about an axis and that includes an annular wall that defines a channel configured to conduct hot combustion gases along a flow-path of combustion gases that is generally parallel to the axis; the annular wall having an exterior first surface and an interior second surface; a plurality of dilution holes defined through the annular wall, a dilution hole of the plurality of dilution holes is defined by a dilution hole surface that extends between an entry end that is defined by the exterior first surface and an exit end that is defined by the interior second surface such that the dilution hole has a convergent cross-sectional profile along a first axis and a divergent cross-sectional profile along a second axis, the second axis being normal to the first axis, wherein the entry end has a first geometric shape and the exit end has a second geometric shape, and the first geometric shape is different than the second geometric shape; and an array of secondary holes defined through the annular wall, the array of secondary holes extending between an entrance defined by the dilution hole surface and an exit defined by the interior second surface, the method comprising the steps of:

generating combustion gases to create combustion gases along a flow path of combustion gases;

introducing dilution air through each dilution hole and the array of secondary holes into the combustion gases such that the dilution air creates turbulence intersects the combustion gases with a broad profile; and generating turbulence in the combustion gases.

20. The method according to claim 19, further comprising the step of spreading the dilution air to create turbulence.

* * * * *